I. C. Richmond,
Harness Hook.

No. 66,391.    Patented July 2, 1867.

Inventor.
Isaac C. Richmond

Witnesses.
E. C. Thompson.
A. J. Tibbits by his Attorney.

United States Patent Office.

ISAAC C. RICHMOND, OF WEST MERIDEN, CONNECTICUT, ASSIGNOR TO JAMES N. HOUGH, OF THE SAME PLACE.

Letters Patent No. 66,391, dated July 2, 1867.

IMPROVED HARNESS-HOOK.

The Schedule referred to in these Letters Patent and making part of the same.

TO ALL WHOM IT MAY CONCERN:

Be it known that I, ISAAC C. RICHMOND, of West Meriden, in the county of New Haven, and State of Connecticut, have invented a new Improvement in Harness-Hook; and I do hereby declare the following, when taken in connection with the accompanying drawings and the letters of reference marked thereon, to be a full, clear, and exact description of the same, and which said drawings constitute part of this specification, and represent, in—

Figure 1:
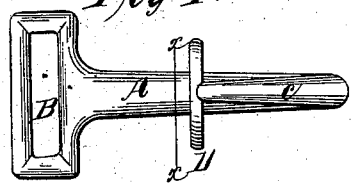
Figure 2:
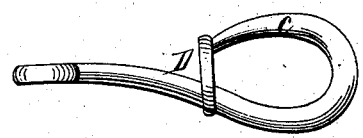
Figure 3:
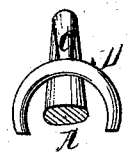

Figure 1, a top view.
Figure 2, a side view.
Figure 3, a section on line $x\ x$ looking towards the hook; and in
Figures 4 and 5, the operation.

This invention is designed to avoid the necessary use of the spring and latch employed in the ordinary harness-hook, and consists in a simple hook, upon the point of which is formed a segmental piece or bar at right angles with the hook, and so that the ring or whatever is to be attached to the hook, or the hook attached to, may be introduced into the hook, and the said segmental bar prevent its unhooking.

In order to the better understanding of my invention, as well as to enable others to construct the same, I will proceed to a description as illustrated in the accompanying drawings.

A is the back of the hook, to which is fixed an eye, B, of the required form; C, the hook proper turned up from the back, as seen in fig. 2. Upon the point of the hook C, and at right angles, is fixed a bar, D, formed segmental, as seen in fig. 3, and so as to cover or extend below the back A. This completes the hook.

Figure 4:
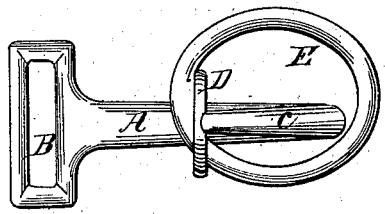
Figure 5:
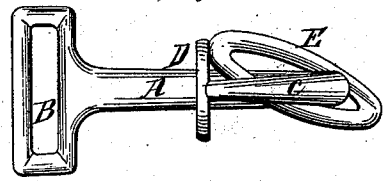

Its operation is as follows: Supposing it to be required to attach the hook to the ring E, first place the hook C within the ring, and so that one leg of the bar D will pass over the ring, as seen in fig. 4; then turn the hook, holding the ring; the ring will naturally work under and pass into the hook below the bar D, as seen in fig. 5; and when thus hooked to the ring it cannot be detached therefrom except by a reverse operation, which cannot, by any possibility, be accidentally done. Thus I have produced a harness-hook in but a single piece, and without spring or latch, and in its construction extremely cheap as compared with ordinary harness-hooks, and applicable to all purposes for which similar hooks are required.

Having thus fully described my invention. what I claim as new and useful, and desire to secure by Letters Patent, is—

A hook having the bar D formed upon the point of the hook, each end of the said bar extending down and partially around the shank of the hook in the manner and so as to operate substantially as set forth.

ISAAC C. RICHMOND.

Witnesses:
JAMES HOUGH,
RATCLIFFE HICKS.